Jan. 14, 1930.                H. P. HOLLNAGEL                 1,743,775
                              MOTION DAMPING MEANS
                           Filed Feb. 1, 1924          2 Sheets-Sheet 1
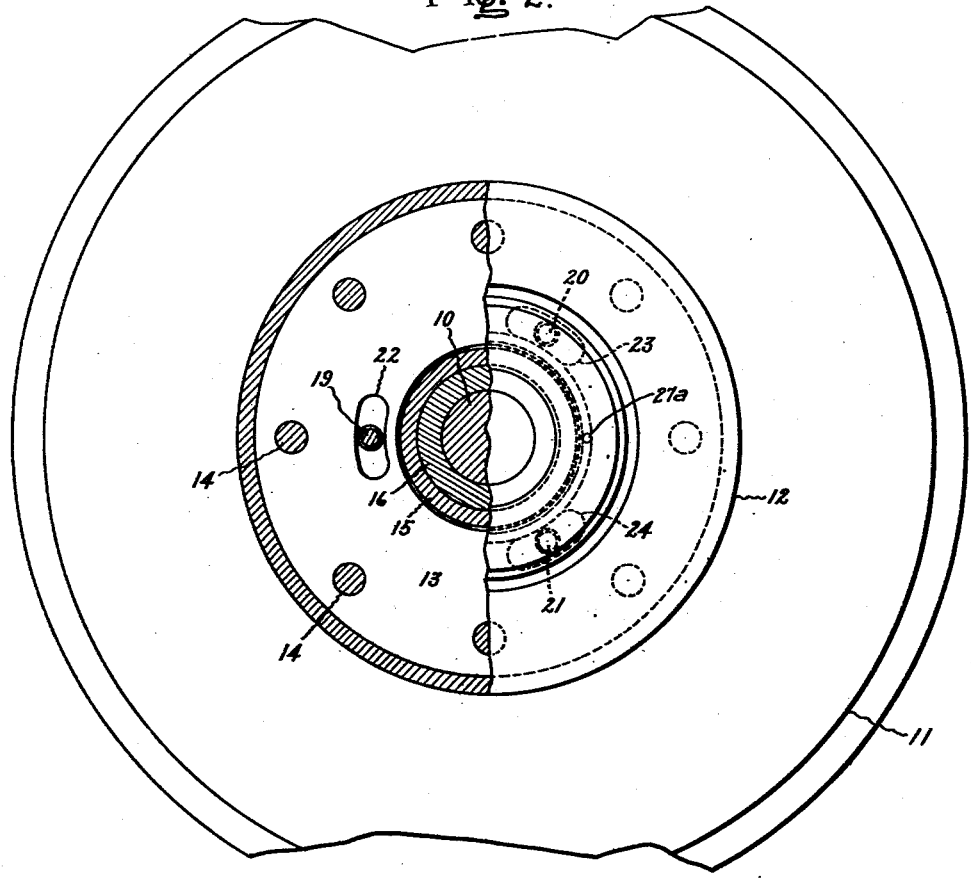
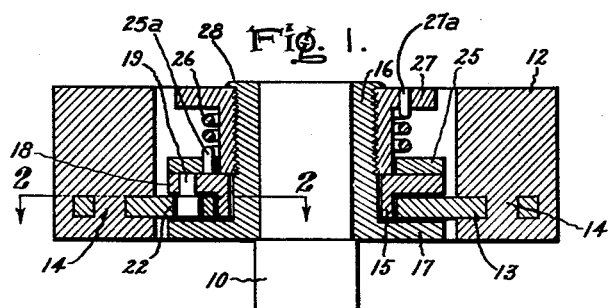
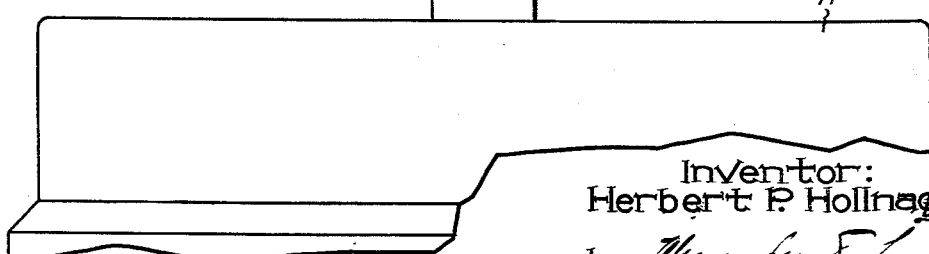
Inventor:
Herbert P. Hollnagel,
by *Alexander S. Lunt*
His Attorney.

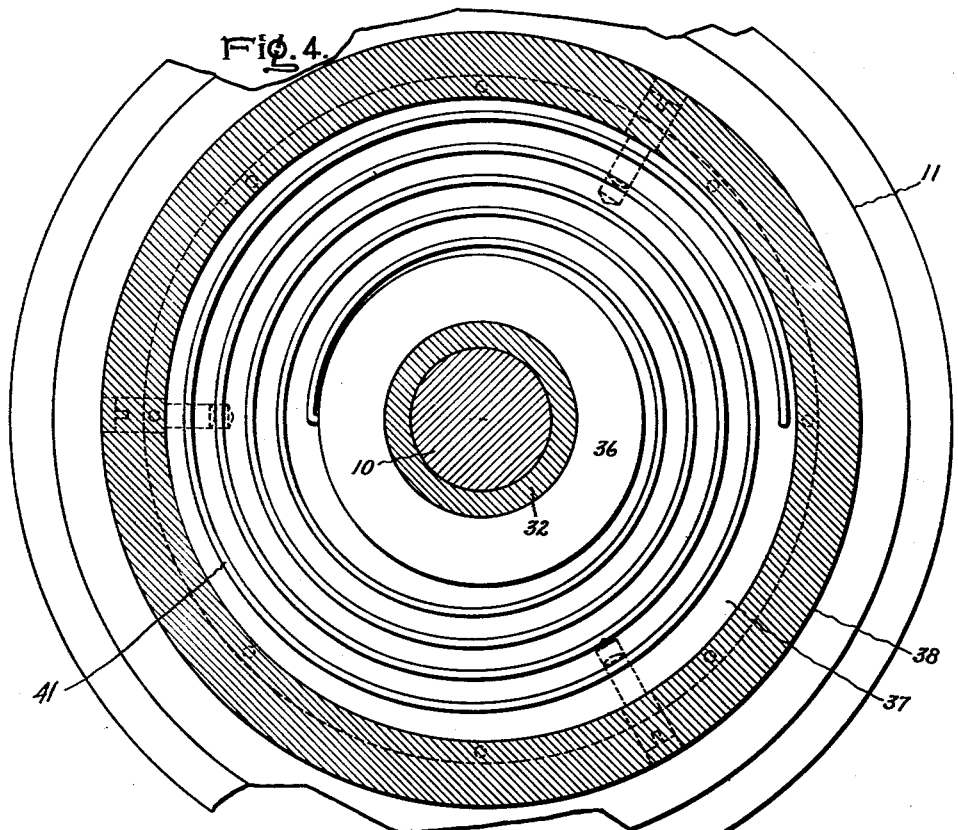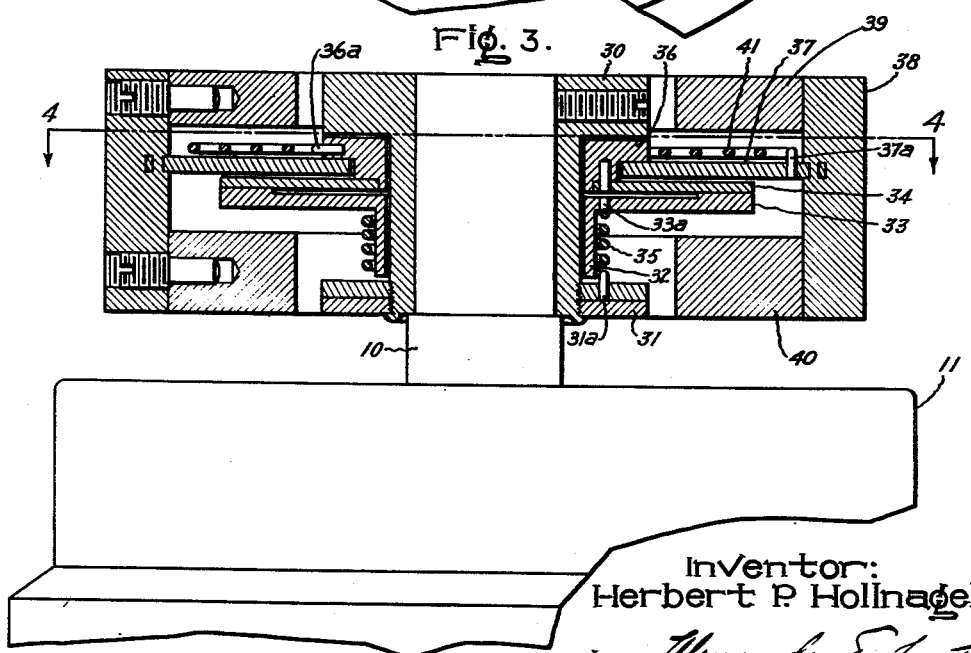

Patented Jan. 14, 1930

1,743,775

UNITED STATES PATENT OFFICE

HERBERT P. HOLLNAGEL, OF SWAMPSCOTT, MASSACHUSETTS, ASSIGNOR TO GENERAL ELECTRIC COMPANY, A CORPORATION OF NEW YORK

MOTION-DAMPING MEANS

Application filed February 1, 1924. Serial No. 690,100.

My invention relates to means for damping members having intermittent motion, and has for its object the provision of means for damping or checking the acceleration of such members as well as their tendency to oscillate in coming to rest.

My invention has application in the damping of moving members in general, although it has particular application in the damping of members having intermittent rotary motion. It may be used, for example, in connection with the rotor of a reproducer or receiver of angular motion. In certain types of receivers of angular motion, the rotor of the receiver in moving from one position to the next may accelerate to such speed as to operate as a synchronous motor. Under these conditions the receiver is obviously useless. Also, the rotor may, and usually does go through a series of oscillations at the end of each movement before finally coming to rest. These oscillations are due to the inertia of the rotor and other parts connected to it. In case the rotor is connected to drive an indicating member, such as a dial, the indicating member will, of course, oscillate with the rotor so that an accurate reading cannot be taken during the period of oscillation, which may mean an appreciable delay. Moreover, in the event of a series of movements in rapid succession, the indicating member might not come to rest to permit the taking of a reading for a considerable interval. Obviously, this tendency to oscillate is a serious disadvantage where time is an important factor.

In carrying out my invention, I provide a damping or inertia body which is associated with the moving member by means of a special driving connection in which energy is dissipated upon reaction with the inertia body to check the acceleration of the moving member and also its tendency to oscillate.

For a more complete understanding of my invention, reference should be had to the accompanying drawing in which Fig. 1 is a plan view in section of an oscillation damper embodying my invention as applied to an instrument for reproducing angular motion; Fig. 2 is an end elevation view of Fig. 1 partially in section taken along the line 2—2 of Fig. 1 looking in the direction of the arrows; Fig. 3 is a plan view in section of a modified form of my invention; while Fig. 4 is a section view along the line 4—4 of Fig. 3 looking in the direction of the arrows.

Referring to Figs. 1 and 2 of the drawing, I have shown my invention in one form as applied to the rotor shaft 10 of an instrument 11 for receiving or reproducing angular motion. My invention obviously has application however to various other moving members. The reproducer or receiving device 11 may be of any suitable type, for example, it may be an alternating current type comprising a polycircuit armature winding with a field winding supplied with alternating current rotatably associated therewith.

In one form of my invention, the damping means for the rotor shaft 10 comprises a heavy flywheel rim or inertia body 12 provided with a ring or washer shaped supporting member 13. The weighted rim 12 may conveniently be formed of lead or other suitable material which may be cast on the supporting member 13, suitable apertures 14 being provided in the supporting member so as to securely anchor the rim thereto. The supporting member 13 is mounted on a sleeve 15 so as to have a limited amount of angular motion with relation thereto, and the sleeve 15 is in turn rotatably mounted on a collar 16 which is rigidly secured to the rotor shaft 10. On the inner end of sleeve 16 is a flange 17 between which and a flange 18 on the outer end of the sleeve 15 the supporting member 13 is held axially in place on the sleeve 15. Carried by the flange 18 are three equally spaced laterally extending pins 19, 20, and 21 which have a limited movement respectively in arc shaped slots 22, 23, and 24, equally spaced in the supporting member 13. This pin and slot connection or lost motion connection between the sleeve 15 and member 13 permits a limited freedom of angular movement between them as determined by the freedom of the pins in the slots. The outer face of flange 18 serves as a brake or clutch face and has frictionally cooperating with it a ring 25 forming the other part of the brake or clutch. The ring 25 is held seated against flange 18 by means of a helical spring 26. One end of the spring 26 is connected to ring 25 while its other end is connected to a flange and sleeve member 27 threaded on the upper end of sleeve 16 and suitably secured thereon as by peening over the end of sleeve 16 at 28. As shown, the ends of spring 26 are bent outward and are seated in holes or recesses 25ª and 27ª in the ring 25 and sleeve 27. Besides holding the ring 25 seated against flange 18, the spring 26 thus forms a driving connection between the shaft 10 of the reproducing device and the ring 25. It will be observed that when the driving torque winds up the spring the lateral pressure applied by the spring to ring 25 will be decreased somewhat. To prevent this the helix of spring 26 is made only slightly larger than the sleeve 27 which extends through it so that when the spring is wound up it will grip the sleeve before the lateral pressure applied to ring 25 has been materially decreased.

The operation of the damping device is as follows: Assuming that a considerable angular movement is to be reproduced by the rotor shaft 10, after the pins 19, 20, and 21 have moved through the amount of freedom permitted by their respective slots, the rotor will suddenly engage the inertia body or rim 12 whereby a certain amount of its energy of rotation is immediately dissipated by the slipping of ring 25 on flange 18. This has the effect of retarding the otherwise rapid acceleration of the rotor so that it is prevented from reaching a speed high enough to operate as a synchronous motor. As the rotor engages the inertia body a certain amount of energy is stored up in the spring 26 by the winding or unwinding of the spring as the case may be, which energy is dissipated in part in the friction clutch. The spring acts as a cushion to relieve the shocks due to the sudden engagement of the rotor with the heavy rim. After the rotor has engaged with the rim as previously described, it will continue its movement carrying the rim around with it. The rotor, however, after executing the required angular movement will over-run due to its own inertia and the inertia of any parts which may be connected to it. When the rotor over-runs it will be understood that a torque tending to turn it back is applied to it by virtue of the electro-magnetic characteristics of the device, which torque rapidly increases with the angle through which the rotor over-runs. The result is that the rotor, if not provided with oscillation damping means, would go through a series of oscillations from one side to the other of the position of rest before finally coming to rest in this position. When using my invention, however, a considerable amount of energy of rotation stored in the rotor and other parts rotating with it is dissipated at each reversal of oscillation, due to reaction with the weighted rim, in the frictional connection by the slipping of ring 25 with relation to flange 18. Thus as the rotor reverses its rotation at the end of each oscillation it will, of course, reverse the rotation of the weighted rim 12 and in so doing will cause the ring 25 to slip on the flange. Slight amounts of energy are further dissipated by means of the spring 26 which is alternately wound up and unwound. A relatively great amount of the stored energy of the rotor is thus dissipated at each reversal with the result that the rotor and incidentally the weighted rim are brought to rest very quickly and after a very few oscillations.

Besides taking part in checking the acceleration of the rotor as previously explained, the pin and slot connection gives the rotor a chance to start back at the end of each oscillation independently of the weighted rim. This is particularly true when the amplitude of the oscillations is but little greater than the length of the slots. The rotor thus gains a certain amount of kinetic energy of rotation in the opposite direction before the pins reach the opposite extremities of their slots and the rotor again engages the rim. This energy of rotation is immediately dissipated in the friction clutch.

In the modified form of my invention shown in Figs. 3 and 4, the sleeve 30 rigidly secured to the shaft 10 is provided on its inner end with a flange 31 between which and a flange on the outer end of the sleeve the various parts are held. The flange 31 is threaded on the end of the sleeve 30 and is secured thereon for example by peening over the end of sleeve 30. A collar 32 is rotatably mounted on the sleeve 30 and is provided on its outer end with a flange 33 which is in frictional engagement with a ring 34 so as to form a clutch or brake. The flange 33 is forced upwardly and held in engagement with the ring 34 by means of a helical spring 35. This spring also forms a driving connection between sleeve 30 and the collar 32, the lower end of the spring being connected to flange 31 and its upper end to flange 33. As shown the ends of the spring are bent outward and seated in holes or recesses 31ª and 33ª in the flanges 31 and 33. The helix of the spring is only slightly larger than the sleeve 32 which extends through it so that the spring when wound up will grip the sleeve whereby a material decrease in the lateral pressure applied by the spring to the flange 33 is prevented. The ring 34 is rigidly secured to a sleeve 36 which is rotatably mounted on sleeve 30 and forms a bearing for a washer shaped supporting member 37 carrying the weighted rim 38. As shown, the weighted rim is cast on the supporting member 37, as described in connection with Figs. 1 and 2. Additional mass is secured by means of two ring members 39 and 40 secured to rim 38 by means of suitable screws. A resilient connection is provided between sleeve 36 and the supporting member 37 comprising a spiral spring 41 having its inner end connected to the sleeve and its outer end connected to the supporting member. The spring 41 may be connected to sleeve 36 and member 37 by bending over its ends and inserting them in holes or recesses 36ª and 37ª in these parts.

In this modification of my invention, it will be observed that the spiral spring 41 takes the place of the pin and slot connection shown in Figs. 1 and 2. The sleeve 36 and supporting member 37 of Figs. 3 and 4 correspond to the sleeve 15 and supporting member 13 of Figs. 1 and 2. The springs 35 and 41 may be and are shown as wound in opposite directions so that when one is wound up, the other is unwound.

In the operation of this modified form of my invention, clutch flange 33 slips on ring 34 to dissipate energy in the same manner that ring 25 slips on flange 18 in the form shown in Figs. 1 and 2. The action of spring 41 is somewhat similar to the action of the pin and slot connection of Figs. 1 and 2. When the rotor starts a considerable amount of energy is stored up in the springs, due to reaction with the inertia body 38, and dissipated whereby the acceleration of the rotor is checked. In damping out oscillations the springs permit the rotor to reverse and gain some energy of rotation in the opposite direction before reversing the heavy rim. During this short period after the rotor starts to reverse and before the rim is reversed the springs 35 and 41, are wound or unwound as the case may be whereby energy is stored in them. This energy is almost immediately dissipated by the slipping of flange 33 and ring 34 with relation to each other. It will be observed that when this slipping occurs, the ring 34 is rotated in one direction under the influence of spring 41, while the flange 33 is rotated in the opposite direction under the influence of spring 35.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desired to secure by Letters Patent of the United States is:—

1. Damping means for a member having rotary motion comprising an inertia body, a lost motion driving connection between said member and said body arranged to provide for limited freedom of rotation between them, and means for dissipating energy upon engagement of said member and said inertia body.

2. Damping means for a body having rotary motion comprising an intertia body rotatably mounted on said moving body, a pair of frictionally cooperating clutch members, a lost motion driving connection between one of said bodies and one of said clutch members, and a driving connection between the other body and clutch member.

3. Damping means for a member having intermittent rotary motion, comprising an inertia body rotatably mounted on said member, and two driving connections between said member and said body, one arranged to provided for limited relative movement independent of said body and the other arranged to provide for unlimited relative movement but dissipating energy during such movement.

4. Damping means for a body having intermittent rotary motion, comprising an inertia body rotatably mounted on said moving body, a pair of frictionally cooperating clutch members, a pin and slot driving connection between one of said bodies and one of said clutch members, and a driving connection between the other body and clutch member.

5. Damping means for a moving body comprising an inertia body rotatably mounted on said moving body, a pair of cooperating clutch members, a flexible coupling between one of said clutch members and one of said bodies, and a connection between the other clutch member and the other of said bodies.

6. Damping means for a body having intermittent rotary motion, comprising an inertia body rotatably mounted on said moving body, a pair of frictionally cooperating clutch members, a spring forming a driving connection between one of said bodies and one of said clutch members, and a driving connection between the other body and clutch member arranged to provide for relative movement between them.

7. Damping means for a body having intermittent rotary motion, comprising an inertia body rotatably mounted on said moving body, a pair of frictionally cooperating clutch members, a driving connection between one of said bodies and one of said clutch members, and a spring forming a driving connection between the other body and clutch member and holding the latter clutch member in frictional engagement with the former.

8. Damping means for a rotating body comprising an inertia body rotatably mounted on the rotating body, a pair of cooperating clutch members rotatably mounted on said rotating body, a spring forming a driving connection between one of said clutch members and one of said bodies, and a connection between the other clutch member and the other of said bodies arranged to provide for limited relative movement between them.

9. Damping means for a rotary member comprising an inertia body rotatably mounted on said member, a pair of frictionally cooperating clutch members, a driving connection between one of said clutch members and said inertia body, and a helical spring surrounding said rotating member having its ends secured to said rotating member and the other clutch member respectively so as to form a driving connection between said rotating member and said clutch member and hold said clutch member in engagement with the first clutch member.

10. Damping means for a member having intermittent rotary motion, comprising an inertia body rotatably mounted on said member, a pair of cooperating clutch members, a pin and slot driving connection between said body and one of said clutch members and a spring forming a driving connection between said moving member and the other clutch member and holding the latter clutch member in frictional engagement with the first.

11. The combination with an electrical instrument for receiving intermittent angular motion provided with a rotor member, of a rotatable inertia body, a driving connection between said rotor member and said inertia body providing for limited freedom of rotation between them, and means for dissipating energy upon engagement of said rotor member and said inertia body so as to damp out the oscillations of said rotor member in coming to rest.

12. The combination with an electrical instrument for receiving angular motion provided with a rotor member, of an inertia body rotatably mounted on said rotor member, and driving means between said rotor member and said inertia body including a lost motion connection and a connection for dissipating energy upon relative movement between said rotor member and said inertia body beyond the limits of said lost motion connection so as to damp out the oscillations of said rotor in coming to rest.

13. The combination with an electrical instrument for receiving angular motion provided with a rotor member, of an inertia body rotatably mounted on said rotor member, a pair of cooperating clutch members, a lost motion driving connection between said inertia body and one of said clutch members, and a spring forming a driving connection between the rotor and the other clutch member and holding the latter clutch member in frictional engagement with the first.

14. The combination with a reproducer of angular motion, of means for checking the acceleration of the rotor of said reproducer and for checking oscillations thereof in coming to rest, comprising a heavy flywheel rim rotatably mounted on said rotor, a flange mounted on said rotor, a pin and slot connection between said flywheel rim and said flange, a ring cooperating with said flange to form a friction clutch, and a spring secured to said ring and said rotor forming a driving connection between them and holding said ring in frictional engagement with said flange, whereby energy is dissipated by relative movement of said ring and flange upon a relative change in the angular velocities of said rotor and flywheel rim.

In witness whereof, I have hereunto set my hand this 28th day of January, 1924.

HERBERT P. HOLLNAGEL.